United States Patent
Tewari

(10) Patent No.: US 6,934,909 B2
(45) Date of Patent: Aug. 23, 2005

(54) IDENTIFYING LOGICAL ELEMENTS BY MODIFYING A SOURCE DOCUMENT USING MARKER ATTRIBUTE VALUES

(75) Inventor: Sourabh Tewari, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 889 days.

(21) Appl. No.: 09/747,830

(22) Filed: Dec. 20, 2000

(65) Prior Publication Data

US 2002/0078100 A1 Jun. 20, 2002

(51) Int. Cl.$^7$ .............................................. G06F 15/00
(52) U.S. Cl. ...................................................... 715/523
(58) Field of Search ................................. 715/523, 517, 715/513, 526, 528, 529, 511, 512, 531

(56) References Cited

U.S. PATENT DOCUMENTS

| | | | | |
|---|---|---|---|---|
| 5,506,985 A | * | 4/1996 | Motoyama et al. | 715/523 |
| 6,298,357 B1 | * | 10/2001 | Wexler et al. | 715/513 |
| 6,336,124 B1 | * | 1/2002 | Alam et al. | 715/523 |
| 6,381,032 B1 | * | 4/2002 | Laverty et al. | 358/1.15 |

OTHER PUBLICATIONS

Adobe Creative Team, "Adobe Acrobat 4.0 Classroom in a Book, Second Edition". <http://proquest.safaribooksonline.com/JVXSL.asp?xt32 1&mode=section&sortKey=rank&sortOrder=desc&view=book&xmlid=0–201–70284–3/ch01lev1sec4&g=&catid=&s=1&b=1&> Jan. 3, 2000. Lesson 1.*

Adobe Creative Team, "Adobe Acrobat 4.0 Classroom in a Book, Second Edition". Jan. 3, 2000. <http://proquest.safaribooksonline.com/?x=1&mode=section&sortKey=title&sortOrder=asc&view=&xmlid=0–201–70284–3/ch03lev1sec4&g=&catid=&s=1&b=1&f=1&t=1&c=1&u> Lesson 3.*

Adobe Creative Team, "Adobe Acrobat 4.0 Classroom in a Book, Second Edition". Jan. 3, 2000. <http://proquest.safaribooksonline.com/JVXSL.asp?x=1&mode=section&sortKey=rank&sortOrder=desc&view=section&xmlid=0–201–70284–3/ch05lev1sec3&g=&srchText=col>Lesson 5.*

Merz, Thomas, "The Structure of PDF, or: whither Acrobat?," Jun. 2000, pp. 1–28.* de Abrew, Karl, "PDF 2000 Conference," 2000, pp. 1–3.*

"Showtime at the PDF 2000 Conference," pp. 1–5.*

* cited by examiner

Primary Examiner—Cesar Paula
Assistant Examiner—Kyle Stork
(74) Attorney, Agent, or Firm—Fish & Richardson P.C.

(57) ABSTRACT

Methods and apparatus, including computer program products, implementing and using techniques for processing an electronic document. A first electronic document including a plurality of logical elements is obtained. Each logical element has a logical type and associated content with a visual appearance. A second electronic document is generated by associating a marker attribute value with a plurality of logical elements in the first electronic document and converting the first electronic document with the associated marker attribute values through a document conversion process. The marker attribute values are a value of a marker attribute and the conversion process preserves the association of the marker attribute values and the logical elements. The marker attribute values are then used to identify logical elements in the second electronic document.

22 Claims, 3 Drawing Sheets

IDENTIFYING LOGICAL ELEMENTS BY MODIFYING A SOURCE DOCUMENT USING MARKER ATTRIBUTE VALUES

BACKGROUND

This invention relates to conversion of electronic documents between different formats.

A significant number of written documents are created in word processing applications on computers. The Microsoft® Word and Corel® WordPerfect® programs are examples of two common word processing applications. In addition to allowing users to enter text in a document, conventional word processing programs allow users to place lists, tables, images, textboxes, equations and other types of objects in the document.

When a user creates a document in a word processing application, the application usually records information about the logical elements in the document. Each logical element has a logical type (for example that the element is a header, a paragraph, a table cell, or an image) and associated content (for example a string of characters or image data) having a visual appearance (for example a certain font, size, or color).

Often the author of a document may want other people to review the document. A convenient way of distributing the document to the reviewers is to distribute the document in electronic form, for example as an e-mail attachment. To ensure that the readers can open the document on their computers, the author may choose to convert the document into a final format before attaching it to the e-mail so the document can be read without having to use a particular word processing application. Such a final format document contains all the information necessary to display or print the document on most computers, that is, the associated content and the visual appearance of the source document's logical elements, but the logical types are typically ignored in the document conversion process. One example of a final format is the portable document format (PDF). The conversion of a source document into a PDF document is typically made by "printing" the source document from a word processing application, for example by using a printer driver that can generate a PDF document, such as a Adobe® Acrobat PDFWriter printer driver, or by using a PostScript printer driver to produce a PostScript document and then converting the PostScript document to PDF using a conversion program such as Adobe Acrobat Distiller.

The absence of logical element information in the converted document limits the usefulness of the converted document. For example, the converted document is not as easily accessible as the source document, especially for visually impaired users. Visually impaired users typically need the logical element information to find different paragraphs, sentences, tables and other elements in the document when using text-to-speech converters to read a document. Also, it is difficult or impossible to recreate a document containing the same information as the source document from the final format document, because the converted document contains no logical element information. Finally, it is difficult or impossible to reflow the content of a converted document to fit a particular size of paper, display device, or display frame. The source document can easily be reflowed in the word processing application, but if a user would like to reflow the final format document, the reflow tools would have to guess in identifying paragraphs, lists, tables, and other logical elements. Reflowing is further described in the commonly-owned U.S. patent application Ser. No. 09/635,999 entitled "Text Reflow In A Structured Document," filed on Aug. 9, 2000.

Attempts have been made to overcome the problems outlined above. One suggested solution is to insert marks, such as PDFmarks, in the source document. Documentation about PDFmarks is available from Adobe Systems Incorporated ("Adobe") of San Jose, Calif., in Adobe Technical Note #5189, copyright 1993–1999, which is available from Adobe. The PDFmarks identify the "boundaries" of logical elements in the source document and are carried through the conversion process into the PDF document. However, the user has to perform the extra step of inserting the PDFmarks manually or automatically in the source document before converting the document, which can be tedious, time consuming, and error-prone, especially if the document is large. The PDFmarks cannot be inserted directly into the source document. For example, in Word it is possible to insert fields and choose a "Print fields" command to print the content of the fields and the logical elements. If the printer is a PostScript printer, commands can be passed to the printer using the inserted fields. The PDFmarks are PostScript operators that can be used to support PDF features through PostScript. Using the operators, it is possible to create, delete, or modify PDF objects when a PostScript file is converted to a PDF file, which can be done using a conversion program such as Adobe Acrobat Distiller. The PDFmark method also has problems with accurately representing complex and nested logical elements of the source document in the PDF document, as well as elements that span pages. The problems arise because boundaries of some logical elements, such as paragraphs, may be intermingled with other logical elements, such as figures or other floating objects, or may overlap the boundaries of the page having the logical element.

SUMMARY

In general, in one aspect, the invention provides methods and apparatus, including computer program products, implementing and using techniques for processing an electronic document. In this aspect, a first electronic document including a plurality of logical elements is obtained. Each logical element has a logical type and associated content with a visual appearance. A second electronic document is generated by associating a marker attribute value, the marker attribute value being a value of a marker attribute, with logical elements in the first electronic document and converting the first electronic document with the associated marker attribute values through a document conversion process that preserves the association of the marker attribute values and the logical elements. The marker attribute values are then used to identify logical elements in the second electronic document.

Advantageous implementations can include one or more of the following features. A third electronic document can be generated, before associating a mark attribute value with the plurality of logical elements in the first electronic document, by transferring the first electronic document through the document conversion process. The marker attribute values in the second electronic document can then be used to identify logical elements in the third electronic document. Each of the logical elements in the second and third electronic documents can have a corresponding logical element in the first electronic document. Each of the logical elements in the second electronic document can have a corresponding logical element in the first electronic document. The document conversion process can be a print process. Generating a second electronic document may comprise associating a different marker attribute value with each of the plurality of logical elements in the first electronic document. Generating a second electronic document may comprise associating a different marker attribute value with each logical element located within one same page of the first electronic document. The marker attribute value can be a color value. The first electronic document can be an electronic document generated in a word processing application. The second electronic document be a PDF document. The logical elements in the second electronic document can be identified by converting the marker attribute values to logical types. The marker attribute values in the second electronic document can be used to create a hierarchal structure for the plurality of logical elements in the second electronic document. Structural information can be obtained from the first electronic document to create a hierarchal structure for the plurality of logical elements in the second electronic document.

In general, in another aspect, the invention provides methods and apparatus, including computer program products, implementing and using techniques for converting a source document including a plurality of logical elements into a PDF document. In this aspect, a first PDF document is produced from the source document. The logical elements of the source document are color-coded. A color-coded, second PDF document from the color-coded source document is produced, and logical elements are created in the first PDF document based on the color-coded PDF document. Each logical element of the color-coded PDF document corresponds to a logical element in the source document.

In general, in yet another aspect, the invention provides methods and apparatus, including computer program products, implementing and using techniques creating a final-format document having logical elements from source document generated by a computer application. In this aspect, an original final-format document is obtained from the computer application. The original final-format document is generated from the source document. Logical elements of the source document are marked. A marked final-format document is obtained from the computer application. The marked final-format document is generated from the marked source document. Logical structure information is obtained from the source application. Logical elements are created in the original final-formatted document using the obtained logical structure information and the marked final-format document.

The invention can be implemented to realize one or more of the following advantages. The logical elements of a source document can be identified in a converted document, such as a PDF document, thereby creating a resulting document that is a visually and logically accurate representation of the source document. The resulting document is more accessible, can be viewed on most computers, can easily be converted to other electronic document formats and can easily be reflowed.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
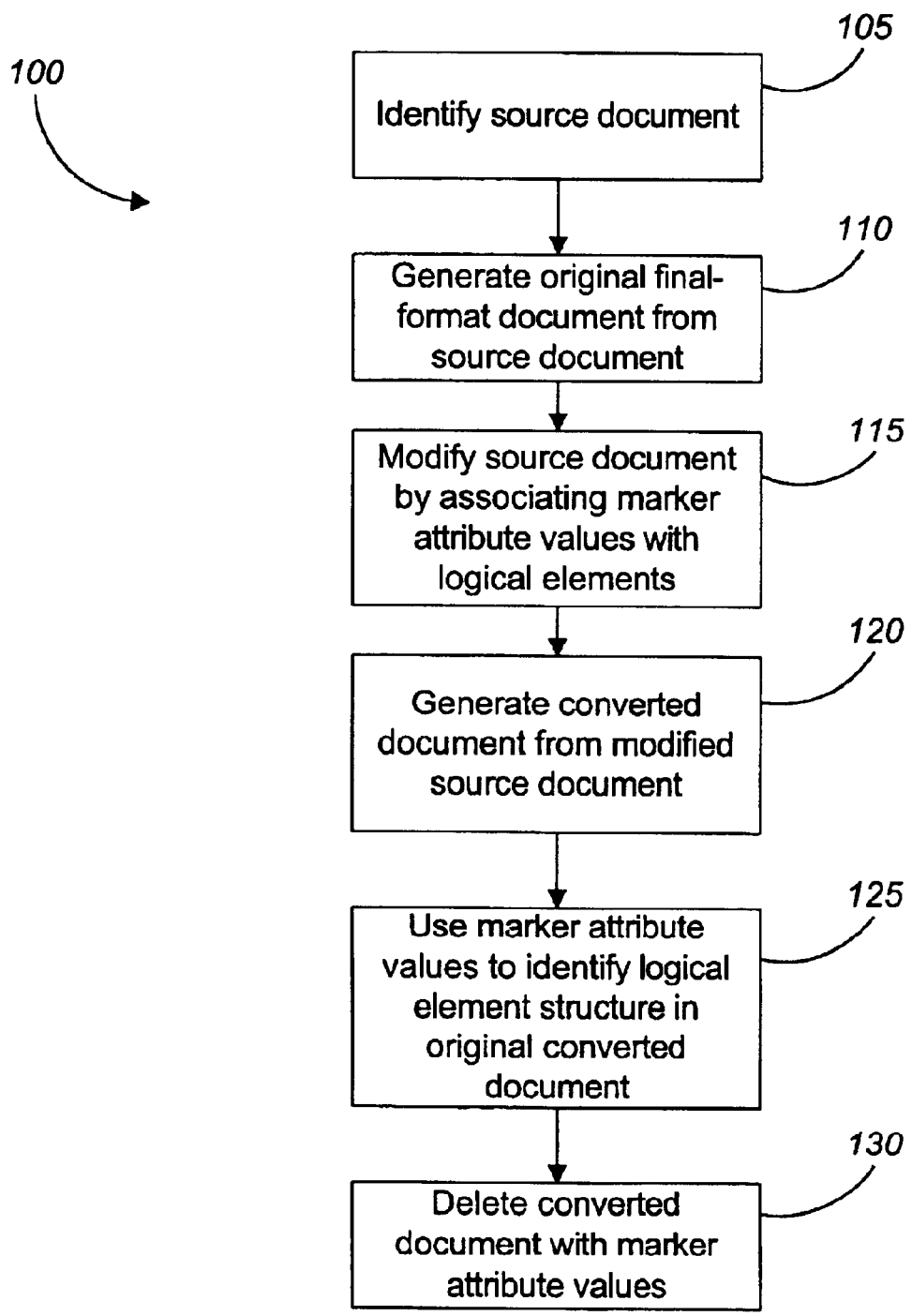
FIG. 1 is a flowchart of a computer-implemented method for processing an electronic document in accordance with the invention.

As shown in FIG. 1, a process 100 converts an electronic source document into a converted electronic document of a final format according to a first aspect of the invention. When the process is completed, the converted document has logical elements corresponding to the logical elements of the source document. The electronic documents are generally stored as one or more computer-readable files.

The process begins by receiving a user input identifying a source document from which a converted document is to be generated (step 105). The source document will typically be a document created in a word processing application. The source document contains logical elements, that each has a logical type and associated content with a visual appearance. The logical type indicates the type of the logical element—such as a header, a paragraph, a text box, and so on. The visual appearance indicates the appearance of the associated content of the logical element—such as font, size, and color, and the associated content is the actual string of text or other data contained in the logical element. In a corresponding converted document, the logical elements' logical types are generally no longer present as such. Only the associated content and the visual appearance information is left, which is sufficient for displaying the associated content of the source documents' logical elements in a fixed format. One example of a converted document is a PDF document.

When the source document has been identified to the process, the process generates an original final-format document from the source document (step 110). For example, a Microsoft Word document can be converted into a PDF document with an Adobe® Acrobat PDFWriter printer driver. The Word document is processed page by page to "print" the PDF document. The print process typically ignores the logical elements' logical types and the only remaining information from the source document is where on a PDF page a certain string of characters is located and the characters' appearance. However, a PDF document per se has the ability to store logical element information.

The process then modifies the source document by associating a marker attribute value with each logical element. In a preferred implementation the marker attribute value is a color value that is assigned to each logical element in the source document (step 115). The color values are preferably assigned so that every logical element at a specified level, for example at a paragraph level in the present implementation of the invention, gets a different associated color. The colors can for example be chosen from an RGB color space, where a red, a green, and a blue color component each is represented by a numerical color value.

In an implementation in a word processing application, the association of colors with the paragraphs in the source document is performed by a macro in the word processing application. The macro associates a marker attribute value with each element by coloring the content of each element in turn with a specific color. This color-coding scheme can be applied to other logical elements, such as headers, list items, and so on. In the specific case where a PDF file is generated from a word processing file, hyperlinks, text in superscript or subscript, underlined or striked-through text and dropped capitals are assigned their own colors.

By using color as a marker attribute, the content of the logical elements in the source application remains unchanged. Most applications can generate thousands or millions of colors, which is sufficient to associate a different color with each logical element in most documents. If the word processing application runs out of colors, the macro reuses the first color for the next logical element, and so on, until all the logical elements have been associated with a color. The same color will then appear thousands or millions of logical elements apart, and there will be no risk of confusing two logical elements when the logical elements of the converted document are identified. The use of a different color for each logical element also makes it possible to assign marker attribute values to logical elements that are divided, for example when a paragraph surrounds an image or a hypertext link. Colors also allow a paragraph that continues from one page to the next to be treated as a single logical element.

The process can also associate marker attribute values to the logical elements of the source document in alternative ways if the user so desires. For example, the process can associate each logical element within a page with a color that is unique for that page in the document so that all the logical elements within a page can be discerned from each other.

The process then converts the source document having marker attribute values associated with the logical elements into a converted document with marker attribute values (step 120) using the mechanism that was used when the original converted document was generated. For purposes of simplifying the description, this converted document will be referred to as the color document hereinafter. The color document, will have the same layout and content as the original converted document, except that it, unlike the original converted document, contains marker attribute values having information about the logical types of the source documents' logical elements. For example, if a different color was assigned to each paragraph in the source document, the produced PDF color document will have paragraphs with the corresponding colors. In other words, the information contained in the logical types of the logical elements in the source document has been transferred to the converted document with the associated marker attribute values.

After producing the converted document with the marker attribute values, the process parses the color document using the marker attribute values in order to identify logical elements in the original converted document (step 125). The process of identifying logical elements in the original converted document will now be described with reference to FIG. 2 and FIG. 3.

Figure 2:
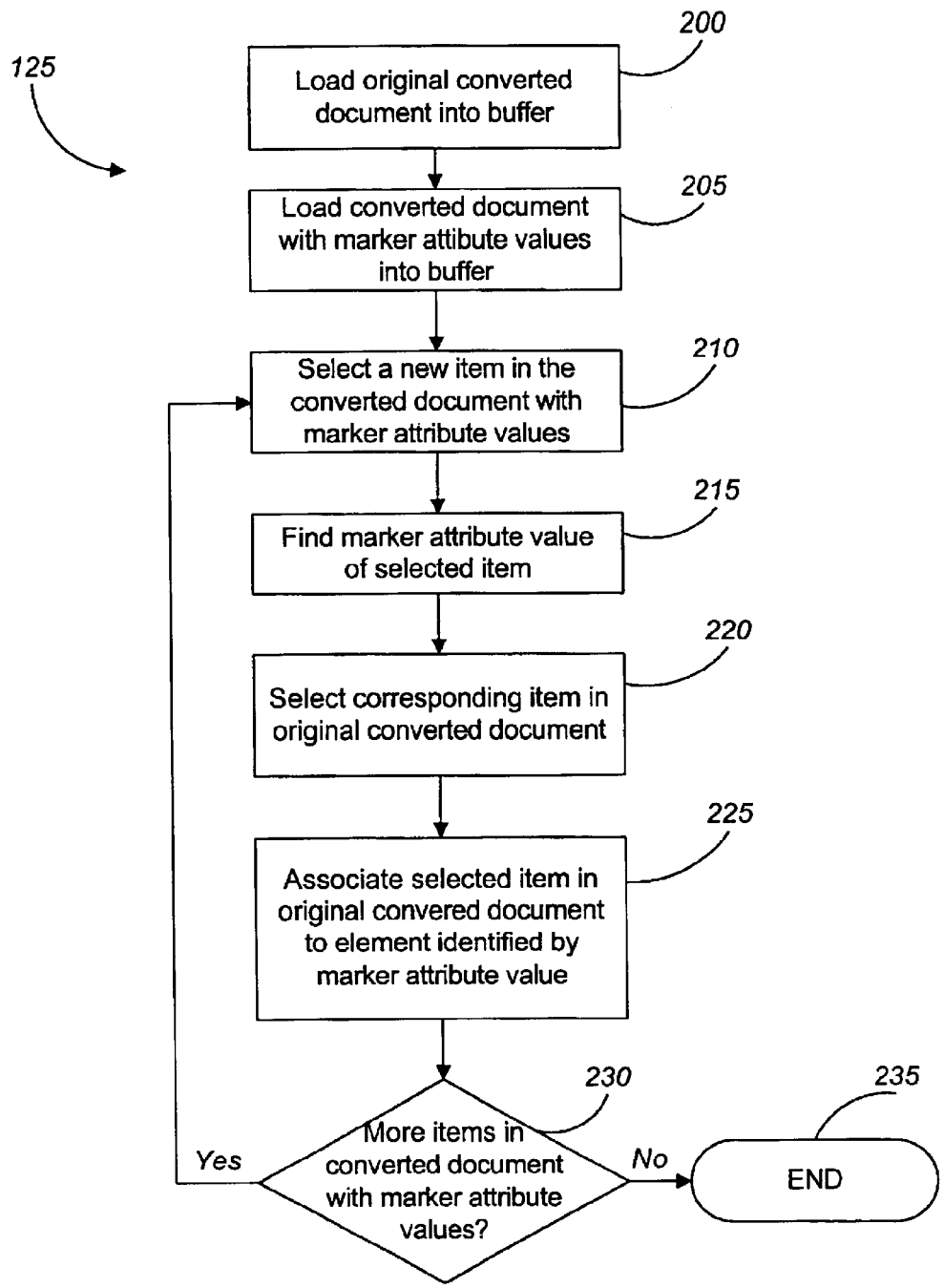
FIG. 2 is a flowchart detailing how logical elements are identified in a converted document.

As shown in FIG. 2., the original converted document is loaded into a buffer (step 200). After loading the original converted document into the buffer, the color document is loaded into the buffer (step 205). An item, typically the first character on the first page, in the color document is selected (step 210) and the marker attribute value of the selected item is determined (step 215). Since the content of the color document is an exact copy of the content of the original converted document, the corresponding item can be selected in the original converted document (step 220). The selected item is associated with a logical element based on the marker attribute value of the corresponding selected item in the color document (step 225). After the item has been associated with a logical element, the process checks to see if there are any items in the color document that have not been used for associating a color with the corresponding characters in the original document (step 230). If there still are more characters, the process repeats steps 210–230 until all the characters have been used, which completes the process (step 235). The items can be selected in a random order, but are typically selected sequentially for one page at a time. When the end of the converted documents has been reached, the buffered original converted document has been transformed into a converted document containing logical elements corresponding to the colored logical elements of the source document. The generation of logical elements in the original converted document is thereby completed and, returning to FIG. 1, the main process ends by deleting the color document (step 130) since all the marker attribute values of the logical elements have been transferred from the color document into the original converted document.

Figure 3:
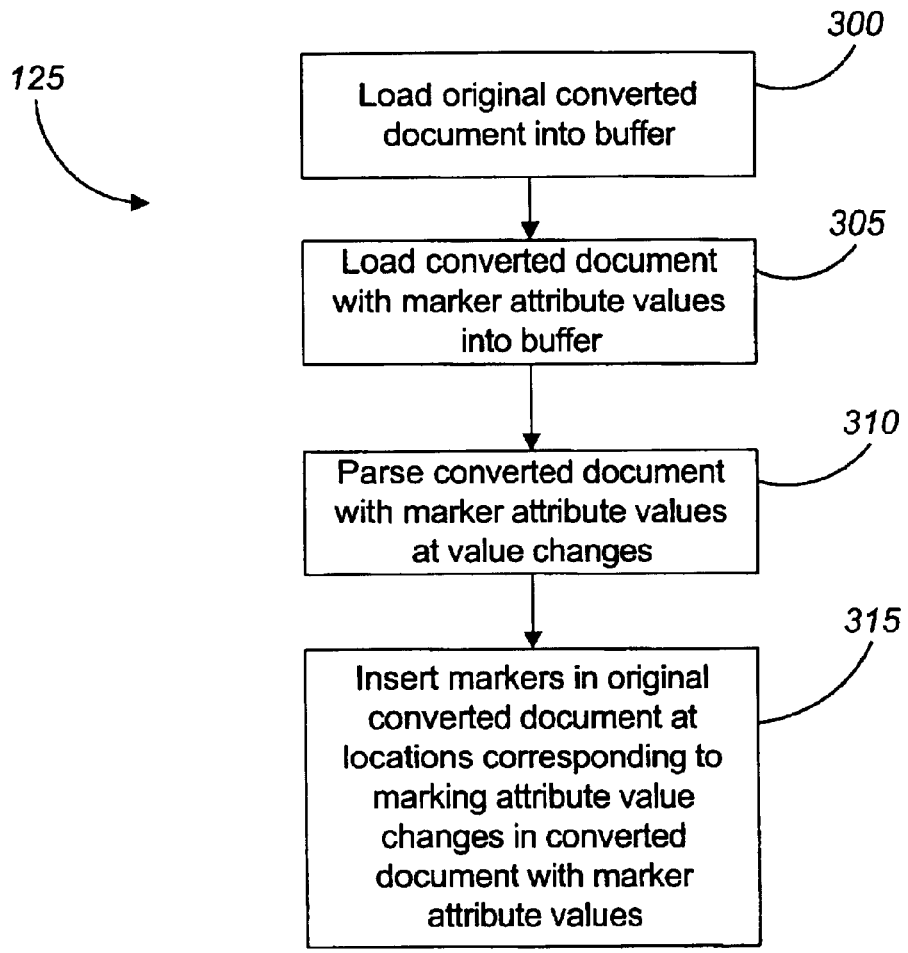
FIG. 3 is a flowchart detailing an alternative way of defining logical elements in the original converted document.

An alternative way of identifying logical elements in the original converted document is shown in FIG. 3, the original converted document and the color document are loaded into a buffer that is managed by a parser (steps 300 and 305). The color document is then parsed through the parser (step 310). For all locations where the parser detects a change of color in the color document, a new-logical-element mark is inserted at the corresponding location in the original converted document (step 315). The end result is a converted document containing logical elements corresponding to the colored logical elements of the source document, just like in the process described above.

The logical elements that are now contained in the original converted document belong to a common hierarchally low level. A logical element hierarchy, in which the low-level logical elements are grouped into higher-level logical elements, for the original converted document can be generated for the original converted document from hierarchal information obtained from the first electronic document, that is, the source document. For example a Word document has a hierarchical structure, and a corresponding hierarchal structure can be added to a PDF document by using various routines from the PDF Library. The PDF Library is available from Adobe Systems Incorporated ("Adobe") of San Jose, Calif. The PDF Library is documented in Adobe PDF Library Overview, Adobe Technical Note #5189, copyright 1998–1999, which is available from Adobe. When the logical elements in the Word document are colored, or associated with marker attribute values, the hierarchy is automatically mapped to the marker attribute values, and can be recreated in the PDF document using the marker attribute values in the color document and the hierarchy routines from the PDF Library. After the hierarchy has been generated in the PDF document, a string of characters can for example be identified as a "hypertext link in the second paragraph of cell three in table four." The converted document thereby becomes much more accessible to a visually impaired reader who uses a text-to-speech converter to read the document. The converted document can also be easily reflowed and converted to other formats, since the document contains information about what logical element different strings of characters belong to.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments of the invention have been described. Nevertheless, it will be understood that various modifications may be made without departing from the spirit and scope of the invention. For example when the source document only contains one color, the original converted document does not have to be created, since all the information that is needed to recreate the logical elements of the source document exist in the converted color file. The color-coding of the source document can be made in a number of different ways depending on what type of logical elements a user wishes to define in the converted document. Accordingly, other embodiments are within the scope of the following claims.

What is claimed is:

1. A computer-implemented method for processing an electronic document, the method comprising:

obtaining a first electronic document including a plurality of logical elements, each logical element having associated content with a visual appearance;

modifying the first electronic document by associating a respective marker attribute value with a marker attribute of each of the logical elements in the first electronic document, each respective marker attribute value being a value of the marker attribute of the content of the respective logical element;

generating a second electronic document by converting the modified first electronic document with the associated marker attribute values through a document conversion process that preserves the association of the marker attribute values and the content of the logical elements;

using the marker attribute values of the content in the second electronic document to identify each of the plurality of logical elements in the second electronic document;

generating a third electronic document before associating a marker attribute value with each of the plurality of logical elements in the first electronic document, by converting the first electronic document through the document conversion process; and using the marker attribute values in the second electronic document to identify logical elements in the third electronic document.

2. The method of claim 1, wherein each of the logical elements in the second and third electronic documents has a corresponding logical element in the first electronic document.

3. The method of claim 1, wherein the document conversion process is a print process.

4. The method of claim 1, wherein generating a second electronic document comprises associating a different marker attribute value with content of each of the plurality of logical elements in the first electronic document.

5. The method of claim 1, wherein generating a second electronic document comprises associating a different marker attribute value with content of each logical element located within one same page of the first electronic document.

6. The method of claim 1, wherein the respective marker attribute value is a color value that is assigned to each respective logical element by coloring the content off each respective logical element.

7. The method of claim 1, wherein the first electronic document is an electronic document generated in a word processing application.

8. The method of claim 1, wherein the second electronic document is a PDF document.

9. The method of claim 1, wherein:

each logical element has a logical type, the logical type comprising at least one of a header, a paragraph, a text box, a list element, a table cell, or an image; and using the marker attribute values to identify logical elements in the second electronic document comprises identifying the logical elements in the second electronic document by converting the marker attribute values to logical types.

10. The method of claim 1, further comprising using the values in the second electronic document to create a hierarchal structure for the plurality of logical elements in the second electronic document.

11. The method of claim 10, further comprising obtaining structural information from the first electronic document to create a hierarchal structure for the plurality of logical elements in the second electronic document.

12. A computer program product, stored on a machine-readable medium, comprising instructions operable to cause a programmable processor to:

obtain a first electronic document including a plurality of logical elements, each logical element having associated content with a visual appearance;

modify the first electronic document by associating a respective market attribute value with a marker attribute of each of the logical elements in the first electronic document, each respective marker attribute value being a value of the marker attribute of the content of the respective logical element;

generate a second electronic document by converting the modified first electronic document with the associated marker attribute values through a document conversion process that preserves the association of the marker attribute values and the content of the logical elements;

use the marker attribute values of the content in the second electronic document to identify each of the plurality of logical elements in the second electronic document;

generate a third electronic document before associating a marker attribute value with each of the plurality of logical elements in the first electronic document, by converting the first electronic document through the document conversion process; and use the marker attribute values in the second electronic document to identify logical elements in the third electronic document.

13. The computer program product of claim 12, wherein each of the logical elements in the second and third electronic documents has a corresponding logical element in the first electronic document.

14. The computer program product of claim 12, wherein the document conversion process is a print process.

15. The computer program product of claim 12, wherein to generate a second electronic document comprises to associate a different marker attribute value with content of each of the plurality of logical elements in the first electronic document.

16. The computer program product of claim 12, wherein to generate a second electronic document comprises to associate a different marker attribute value with content of each logical element located within one same page of the first electronic document.

17. The computer program product of claim 12, wherein the respective marker attribute value is a color value that is assigned to each respective logical element by coloring the content of each respective logical element.

18. The computer program product of claim 12, wherein the first electronic document is an electronic document generated in a word processing application.

19. The computer program product of claim 12, wherein the second electronic document is a PDF document.

20. The computer program product of claim 12, wherein:
each logical element has a logical type, the logical type comprising at least one of a header, a paragraph, a text box, a list element, a table cell, or an image; and to use the marker attribute values to identify logical elements in the second electronic document comprises to identify the logical elements in the second electronic document by converting the marker attribute values to logical types.

21. The computer program product of claim 12, further comprising instructions operable to cause a programmable processor to use the marker attribute values in the second electronic document to create a hierarchal structure for the plurality of logical elements in the second electronic document.

22. The computer program product of claim 21, further comprising instructions operable to cause a programmable processor to obtain structural information from the first electronic document to create a hierarchal structure for the plurality of logical elements in the second electronic document.

* * * * *